Feb. 17, 1970  N. N. AXELROD  3,495,909
VACUUM MONOCHROMATOR HAVING MEANS FOR SCANNING THE SPECTRUM
AND MAINTAINING A CONSTANT ANGLE OF INCIDENCE TO THE GRATING
Filed Dec. 17, 1965

INVENTOR
NORMAN N. AXELROD
BY
*Herbert M. Shapiro*
ATTORNEY

United States Patent Office 3,495,909
Patented Feb. 17, 1970

3,495,909
VACUUM MONOCHROMATOR HAVING MEANS FOR SCANNING THE SPECTRUM AND MAINTAINING A CONSTANT ANGLE OF INCIDENCE TO THE GRATING
Norman N. Axelrod, 29 Oakridge Ave., Summit, N.J. 07901
Filed Dec. 17, 1965, Ser. No. 514,512
Int. Cl. G01n 23/28
U.S. Cl. 356—100                     6 Claims

ABSTRACT OF THE DISCLOSURE

It has been found that the movement of a diffractive grating and exit slit during the normal operation of a vacuum monochromator can be approximated by slight changes in the position of the grating alone if the grating is moved in a manner to maintain constant the angle of incident radiation thereto. A relatively simple mechanical implementation for the requisite movement is described.

---

Figure 1:
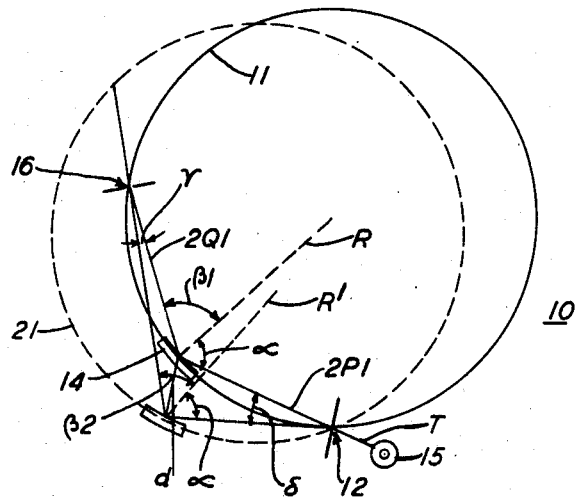

This invention relates to monochromators and more particularly to vacuum monochromators including a diffraction grating.

Monochromators are optical devices employed for the analysis of radiation spectra. Frequently, a monochromator includes an entrance slit, an exit slit, and a diffraction grating arranged in a vaccum apparatus in a manner well understood in the art.

Radiation, normally, is directed at the grating of a monochromator through the entrance slit thereof. That radiation is dispersed by the grating into components which are focused along a circle drawn through the entrance slit and the grating. To this end, the grating is concave as is well known.

The radiation components often take the form of discrete spectral lines which are images of the entrance slit. The circle along which those spectral lines are in focus is known as a Rowland circle. The exit slit is advantageously moved along the Rowland circle to examine (scan) different spectral components under in-focus conditions. Experience indicates that available apparatus for so moving the exit slit about the Rowland circle has significant drawbacks. For example, for so moving the exit slit, the area of the entire Rowland circle must be maintained in a suitable vacuum. Alternatively, the monochromator must include complicated moving vacuum couplings which rotates and translate over long distances. Consequently, such arrangements have been abandoned in favor of more compact apparatus such as the well-known Eagle mounting.

The Eagle mounting provides for the rotation of the diffraction grating about an axis normal to the Rowland circle. The grating, however, has a radius of curvature equal to the diameter of the Rowland circle and is tangent to that circle. A rotation of the grating, then, rotates the Rowland circle and both the exit and entrance slits are quickly out-of-focus. Accordingly, means are provided to move the exit slit and/or the grating to positions again on a Rowland circle. As is well known, this type of mounting is also complex and quite expensive.

Usually, monochromators are operated at near normal angles of incidence. In, for example, the extreme vacuum ultraviolet region ($\lambda = 100$ A. to 500 A. where A.=angstrom units), however, it is desirable to employ grazing angles of incidence to obtain, inter alia increased reflectivity as is well known. At grazing angles, the tendency of existing apparatus to become out of focus, for example, as described above, is magnified. It is well known that providing in-focus conditions for the analysis of radiation at grazing angles is most difficult. For reference, angles of incidence of 70 degrees or more (from the normal) are considered grazing angles.

An object of this invention is to provide a new and novel vacuum monochromator. A further object of this invention is to provide a simple mechanical implementation for scanning spectral components in a monochromator.

The foregoing and further objects of said invention are realized in one embodiment thereof wherein the diffraction grating of a vacuum monochromator is rigidly mounted on an arm rotatable about a center located at the entrance slit. Scanning of spectral components is permitted by rotations of the arm through small angles. Such rotations move the grating in a manner to maintain constant the angle of incidence thereto. Moreover, the entrance slit is always in focus. The resulting movement of the grating is tantamount to rotating the Rowland circle about the entrance slit.

Accordingly, a feature of this invention is a grating monochromator including a diffraction grating and means for moving the grating in a manner to maintain constant the angle of incidence thereto and to maintain in focus the entrance slit thereof.

Another feature of this invention is a monochromator including an exit slit, a fixed entrance slit, and a diffraction grating, disposed along a Rowland circle and means for moving the diffraction grating in a manner to rotate the Rowland circle about the entrance slit.

Still another feature of this invention is a monochromator including an arm rotatable about an entrance slit thereof and a diffraction grating rigidly secured to that arm.

Figure 2:
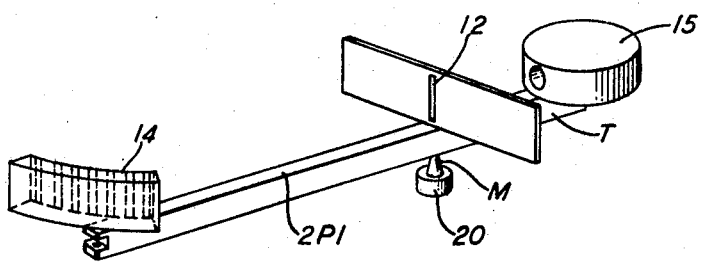
Figure 3:
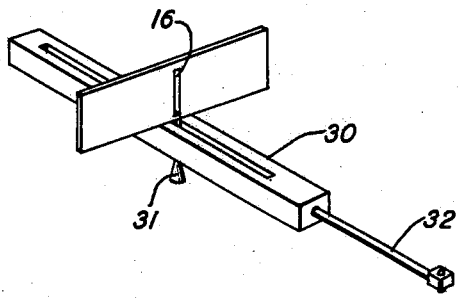

The foregoing and further objects and features of this invention will be understood more fully from a consideration of the detailed description rendered in conjunction with the accompanying drawing wherein:

FIG. 1 is a diagrammatic view of a monochromator in accordance with this invention; and FIGS. 2 and 3 are perspective views of portion of the monochromator of FIG. 1.

More specifically FIG. 1 shows a monochromator, in accordance with this invention, indicated generally by the numeral 10. Monochromator 10 "includes" a Rowland circle 11, along which are disposed a light entrance slit 12, and a reflective type diffraction grating 14. Diffraction grating 14 is rigidly mounted to an arm indicated in FIG. 1 by a line designated 2P1, as will become clear hereinafter, rotatable about the entrance slit 12.

Diffraction grating 14 is disposed such that light (generally radiation) of wavelength $\lambda$ from a source 15, directed at entrance slit 12 by any suitable means, impinges thereon. The grating disperses the light into spectral line components which are reflected from the grating and focused along the Rowland circle 11 as has been stated hereinbefore. Line 2P1 represents the mean light path from the entrance slit to the grating as well as the arm 2P1. The mean light path from the grating to the exit slit is represented by the line designated 2Q1.

A selected spectral line passes through exit slit 16 for detection by any suitable detection means (not shown). The particular spectral line selected depends upon the position of the grating as will become clear hereinafter. In accordance with this invention the exit slit scans a plurality of spectral lines by the movement of the grating 14 off the initial Rowland circle 11 by a rotation of arm 2P1 about a center at slit 12.

Consider the rotation of arm 2P1 about the entrance slit 12 through an angle $\delta$ such that the grating is moved a distance $d$ from its initial position. Such a situation is depicted in FIG. 1. A new Rowland circle including the entrance slit and the new position of the grating is indicated by the broken circle 21. It is clear that when grating 14 is moved onto the Rowland circle 21, the radiation components reflected therefrom are in focus on that Rowland circle. Exit slit 16 remains unmoved and is, accordingly, in an out-of-focus position. When the grating 14 is on circle 11, the exit slit is in the in-focus condition.

Let broken line R of the FIGURE 1 represent the normal to grating 14 when positioned in circle 11. Then $\beta 1$ represents the in-focus angle of diffraction for the selected spectral line. The line 2Q1 may be taken to indicate the distance between grating 14 and exit slit 16. Similarly, R' represents the normal to the grating 14 when positioned in the Rowland circle 21. Then $\beta 2$ represents the out-of-focus angle of diffraction. The angle of incidence $\alpha$ of light incident upon the grating is constant for the in-focus and out-of-focus conditions. The angle at the exit slit between the in-focus and out-of-focus positions for line 2Q1 is designated $\gamma$.

The dependence of the wavelength variation, and the resolution, and the intensity thereof on the displacement of the grating from the in-focus condition is now discussed. It is to be understood, for the purposes of this calculation, that the energy reflected from the grating is focused on the Rowland circle corresponding to the position of the grating, that the fixed exit slit intercepts that energy in a simple geometric way in two dimensions, and that the angle of incidence remains constant.

It is now shown that the more conventional motion of the grating and the exit slit along a given Rowland circle can be approximated by a displacement of the grating from the Rowland circle in accordance with the invention while the exit slit remains fixed.

The out-of-focus angle of diffraction $\beta 2$ is given in terms of the geometrical parameters (see FIG. 1) and the in-focus angle of diffraction $\beta 1$ by $$\beta 2 + d[(\frac{1}{2}P1) + (\alpha/2Q1)] = \beta 1 \quad (1)$$

where $x = \cos[\pi - (\alpha + \beta 1) + \gamma + \delta/2]$ is approximately constant,
$d$ is the linear displacement of grating,
2P1 is the length of arm 2P1 and 2Q1 is the length of path 2Q1, so that:

$$\lambda \approx \lambda_0 + [(e \cos \beta 1)/(2R)]\left[\left(\frac{1}{\cos \alpha}\right) + (a/\cos \beta 1)\right]d \quad (2)$$

where 2R is the diameter of the Rowland circle and $e$ is the grating spacing. For an exit slit of "zero" (negligible) width, the bandpass for an out-of-focus situation is:

$$\delta\lambda_0 = \frac{eL}{2R} \cos \beta 2 \left[\frac{a \cos \beta 2}{\cos \beta 1 \cos \left(\pi - (\alpha + \beta 1) + \frac{\delta}{2}\right)} - 1\right]$$

$$\simeq \frac{eL \cos \beta 2}{2R}\left(\frac{\cos \beta 2}{\cos \beta 1} - 1\right) \quad (3)$$

where L is the length of the grating along the Rowland circle; note that $\delta\lambda_0$ becomes zero for $\beta 2 = \beta 1$. The ratio of the bandwidth for a slit of width S to the bandwidth for a slit of zero width (for a nonzero $\delta\lambda_0$) is approximately given by:

$$\frac{S\lambda}{S\lambda_0} \simeq \frac{S}{L(\cos \beta 2 - \cos \beta 1)} \quad (4)$$

For a single wavelength, the ratio of the width of slit S to the linear cross section of the beam at the fixed exit slit is given by:

$$F = \left[\frac{S}{L}\right]\frac{\cos \beta 2 - \cos \beta 1 \left[\cos \left(\pi - (\alpha + \beta 1) + \frac{1}{2}\delta\right)\right]}{\cos \left(\pi - (\alpha + \delta 1) + \gamma + \frac{1}{2}\delta\right)]}$$

$$\simeq \left[\frac{S}{L}\right][(\cos \beta 2 - \cos \beta 1)^{-1}] \quad (5)$$

This is equivalent to the ratio of the energy which gets through the slit to the energy which would have focused at the rotated Rowland circle if there had not been any obstruction (e.g., the fixed exit slit). This calculation is valid for $F \leq 1$.

Let us now consider a particular example encountered using typical values for Rowland circle design. Specifically, consider a 2 m. Rowland circle, i.e., $R = 1$ meter (m.), an angle of incidence $\alpha = 80°$, an exit slit of $100\mu$ (micron) width, a line entrance slit (of negligible width), and a grating with 1200 lines/mm. and a width L of 2 cm. Then $\beta 1 = 73° 53'$ for $\lambda_0 = 200$ A., and $\beta 2 = 72° 41'$ for $\lambda_0 = 250$ A. Also, $2P1 = 2R \cos \alpha = 34.7$ cm., $2Q1 = 2R \cos \beta 1 = 55.5$ cm., $\lambda_0 = 200$ A. + 10.4 d. (mm.), $\delta\lambda_0 \simeq 2.0$ A., and $\delta\lambda_1/\delta\lambda_0 \simeq 0.22$, so that $\delta\lambda = \delta\lambda_0$
$+ \delta\lambda_1 \simeq 2.5$ A., and $F = 0.29$ Thus, the worst bandpass which we obtain in a 100 A. scan is approximately 2.5 A. for a total scan of approximately 100 A. centered at 200 A.; the maximum bandpass for a 50 A. scan is about half this figure. The first correction term (proportional to $d^2$) for Equation 2 alters $\lambda$ by about 2 A. near 250 A.

In a 100-A. scan, the total movement of the grating is approximately 1 cm. so that it passes through an angle of less than 2° during this motion. Many sources have a 1 cm. spread at a distance of 35 cm.; if it is considered necessary, the entrance slit could be cocked continuously automatically, or by discrete amounts for directing radiation at the grating during a scan operation. Such an arrangement is implemented conveniently by rigidly mounting the means defining entrance slit 12 and source 15 on extension T of arm 2P1 as indicated in FIG. 1 and shown in FIG. 2. It is clear that arm 2P1 pivots on a pivot point (center) designated M in FIG. 2 just under slit 12. Means for rotating arm 2P1 may comprise any means adaptable to this end and is indicated in FIG. 2 by a clock designated 20 illustratively located at the pivot point.

Of course the fixed exit slit is, illustratively, "fixed" only while the spectrum is being scanned. The exit slit may be adjusted to be in-focus for any predetermined wavelength $\lambda_0$ by a movement of the exit slit to a different initial position for scanning by grating motion. Alternatively, the exit slit may be adjusted continuously during the grating motion for providing in-focus operation. One means for so adjusting the exit slit comprises, conveniently, settable or telescoping mounting (not shown) to which the means defining exit slit 16 is mounted for movement along a guide 30 of FIG. 3. Guide 30 is oriented along line 2Q1 of FIG. 1 and pivots about pivot point 31 under exit slit 16. The guide, conveniently, is slidably coupled to a piston arm 32 which hingeably mates with arm 2P1 at grating 14.

The invention has been described in terms of a grating mounted on an arm which rotates about a center which is under the entrance slit. This arrangement maintains the constant angle of incidence and the entrance slit fixed. Another arrangement would be to move the grating "linearly," thereby approximating an arc of a circle. In order to maintain the angle of incidence, the grating would then be rotated about its own vertical axis. The rotation of the grating about its axis is at a rate directly proportional to the linear motion of the grating as a whole.

Vacuum monochromators are well known in the art. Also the various elements and the mechanical implementations for the repositioning of the elements of such monochromators are well known. Accordingly, the elements and the means for repositioning the elements of a monochromator in accordance with this invention have been indicated in representative form only. Such elements and repositioning means may comprise any such elements and means adaptable for operation in accordance with this invention.

It is consistent with prior art teaching that the path of the radiation between entrance and exit slit be evacuated. It is clear that only a small area of the Rowland circle need be evacuated in accordance with this invention. For example, an exit slit as shown in FIG. 3 mounted on a settable mounting may be positioned within an evacuated chamber. If a telescoping mounting is used, the mounting may include seals enabling the vacuum to terminate at the exit slit. Any vacuum apparatus adaptable for so providing such a vacuum stretch is suitable to this end. Such apparatus, although not shown, is assumed present as would be apparent to one skilled in the art.

It is to be understood that the above-described arrangements are merely illustrative of the principles of this invention. Thus, numerous and varied other arrangements can readily be devised in accordance with those principles by one skilled in the art without departing from the spirit and scope of the invention.

What is claimed is:

1. A vacuum monochromator including means for defining a fixed entrance slit, means for defining an exit slit and a diffraction grating disposed with respect to one another on a Rowland circle, means for directing radiation through said entrance slit at said grating, and means for scanning the spectrum of said radiation, said last-mentioned means comprising means for moving said grating in a manner to maintain constant the angle of incident thereto, said last mentioned means comprising an arm rotatable about said entrance slit, said grating being rigidly mounted on said arm.

2. A vacuum monochromator in accordance with claim 1 wherein said entrance slit and said grating are arranged such that radiation directed through said entrance slit is incident to said grating at a grazing angle.

3. A vacuum monochromator in accordance with claim 2 wherein said means defining said entrance slit and said grating are rigidly mounted on said rotatable arm.

4. In combination, a vacuum monochromator in accordance with claim 3 and a source of radiation, said source being rigidly mounted on said rotatable arm in a position to direct radiation through said entrance slit toward said grating.

5. A vacuum monochromator in accordance with claim 3 including means for fixing the position of said exit slit on a Rowland circle with respect to said entrance slit and said grating while said grating is being moved.

6. A vacuum monochromator in accordance with claim 3 including means for moving the position of said exit slit to selected positions as said grating is being moved.

References Cited

UNITED STATES PATENTS 3,073,952   1/1963   Rose _____ 250—51.5

RALPH G. NILSON, Primary Examiner

A. L. BIRCH, Assistant Examiner

U.S. Cl. X.R.

250—51.5; 356—51, 79